United States Patent
Huang et al.

(10) Patent No.: US 11,881,698 B2
(45) Date of Patent: Jan. 23, 2024

(54) BUS DUCT SHELL AND BUS DUCT

(71) Applicant: Schneider Electric Industries SAS, Rueil Malmaison (FR)

(72) Inventors: Jianliang Huang, Guangdong (CN); Jianyuan Huang, Guangdong (CN); Yunfeng Xu, Guangdong (CN)

(73) Assignee: Schneider Electric Industries SAS, Rueil Malmaison (FR)

( * ) Notice: Subject to any disclaimer, the term of this patent is extended or adjusted under 35 U.S.C. 154(b) by 624 days.

(21) Appl. No.: 17/050,708

(22) PCT Filed: Apr. 19, 2019

(86) PCT No.: PCT/CN2019/083384
§ 371 (c)(1),
(2) Date: Oct. 26, 2020

(87) PCT Pub. No.: WO2019/206029
PCT Pub. Date: Oct. 31, 2019

(65) Prior Publication Data
US 2021/0075205 A1 Mar. 11, 2021

(30) Foreign Application Priority Data
Apr. 27, 2018 (CN) .......................... 201820618725.0

(51) Int. Cl.
*H02G 5/08* (2006.01)
*H02G 5/04* (2006.01)

(52) U.S. Cl.
CPC ................. *H02G 5/08* (2013.01); *H02G 5/04* (2013.01)

(58) Field of Classification Search
CPC .. H02G 5/04; H02G 5/06; H02G 5/08; H02G 5/005; H01R 13/405; H01R 13/502
See application file for complete search history.

(56) References Cited

U.S. PATENT DOCUMENTS

| 2,870,240 A | 1/1959 | Stieglitz |
| 3,489,846 A * | 1/1970 | Fehr, Jr. ................. H02G 5/002 174/88 B |

(Continued)

FOREIGN PATENT DOCUMENTS

| CN | 101958522 A | 1/2011 |
| CN | 202997463 U | 6/2013 |

(Continued)

OTHER PUBLICATIONS

Extended European Search Report dated Dec. 13, 2021 for corresponding European Patent Application No. 19792969.8-1201, 12 pages.

(Continued)

*Primary Examiner* — Oscar C Jimenez
(74) *Attorney, Agent, or Firm* — Locke Lord LLP

(57) ABSTRACT

Provided is a bus duct shell, including: a first lateral plate; a second lateral plate opposite the first lateral plate; a first cover plate; a second cover plate opposite the first cover plate; a first end being integrally formed with the first cover plate and extending from the end of the first cover plate beyond the first lateral plate and the second lateral plate; and a second end being integrally formed with the second cover plate and extending from the end of the second cover plate beyond the first lateral plate and the second lateral plate, wherein the first later plate, the second later plate, the first cover plate and the second cover plate extend in a first direction and define a cavity for accommodating a bus and extending in the first direction. Further provided is a bus duct including the bus duct shell.

16 Claims, 6 Drawing Sheets

(56) References Cited

U.S. PATENT DOCUMENTS

| | | | |
|---|---|---|---|
| 5,811,733 A * | 9/1998 | Flaig | H02G 5/06 |
| | | | 439/212 |
| 6,435,888 B1 * | 8/2002 | Reed, Jr. | H01R 4/30 |
| | | | 174/88 B |
| 8,711,549 B2 | 4/2014 | Rodrigues et al. | |
| 9,520,688 B2 * | 12/2016 | Sheridan | H01R 25/162 |
| 2013/0012079 A1 * | 1/2013 | Sakae | H01M 50/571 |
| | | | 439/884 |
| 2014/0144668 A1 * | 5/2014 | Walgenbach | H02G 5/10 |
| | | | 174/68.2 |
| 2017/0201080 A1 | 7/2017 | Maurer et al. | |

FOREIGN PATENT DOCUMENTS

| | | |
|---|---|---|
| CN | 204089108 U | 1/2015 |
| CN | 105633880 A | 6/2016 |
| CN | 206313403 U | 7/2017 |
| CN | 208209473 U | 12/2018 |

OTHER PUBLICATIONS

Schneider Electric, "How to install Canalis KT ", Dec. 11, 2017, XP055868143, Retrieved from the Internet: URL:https://www.youtube.com/watch?v=rG-4Qqw1JOY&t=108s [retrieved on Dec. 1, 2021], 2 pages.
International Search Report for International Application No. PCT/CN2019/083384, dated Jul. 2, 2019, 4 pgs.

* cited by examiner

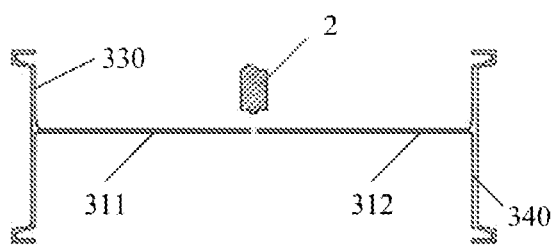
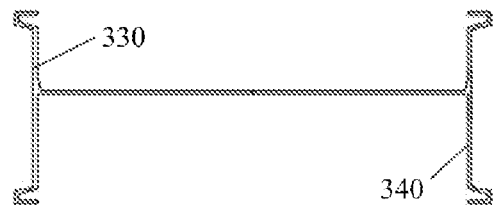
Fig. 8A     Fig. 8B
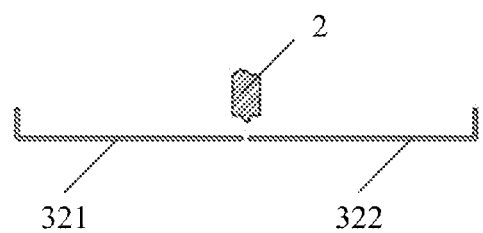
Fig. 9A     Fig. 9B

BUS DUCT SHELL AND BUS DUCT

CLAIMED BENEFITS

This application claims the priority of the Chinese patent application No. 201820618725.0 filed on Apr. 27, 2018, which is incorporated herein by referenced in its entirety.

TECHNICAL FIELD

The present disclosure relates to a bus duct shell and a bus duct.

BACKGROUND

A bus duct is used to distribute high power to various components of a distributed system. The bus duct has the advantages of small size, large capacity, short design and construction period, and convenient assembly and disassembly. In indoor low-voltage power transmission main line projects, wires and cables have been increasingly replaced. According to the purpose of the bus duct, the bus duct includes starting bus duct, straight bus duct, L-shaped bus duct, Z-type horizontal (or vertical) bus duct, terminal bus duct, etc. A bus bar is arranged in a bus duct shell, and the end of the bus bar protrudes from the bus duct shell to be connected with a bus bar in another bus duct via a connector.

The existing bus duct shell has the following shortcomings: 1) low grounding capacity; 2) poor rigidity and waterproof performance.

SUMMARY

One aspect of the present disclosure relates to a bus duct shell, which includes: a first lateral plate; a second lateral plate opposite to the first lateral plate; a first cover plate; a second cover plate opposite to the first cover plate; a first end head integrally formed with the first cover plate and extends from an end of the first cover plate beyond the first lateral plate and the second lateral plate; and a second end integrally formed with the second cover plate and extend from an end of the second cover plate beyond the first lateral plate and the second lateral plate; wherein, the first lateral plate, the second lateral plate, the first cover plate and the second cover plate extend in a first direction, and define a cavity that accommodates a bus bar and extends in the first direction.

For example, in some embodiments, the end of the bus bar is located between the first end head and the second end head.

For example, in some embodiments, the first end head is offset relative to the first cover plate in a direction away from the cavity to include a first bent portion that is bent in the direction away from the cavity and a first extension extending in the first direction, and the second end head is offset relative to the second cover plate in a direction away from the cavity to include a second bending part that is bent in the direction away from the cavity and a second extension extending in the first direction.

For example, in some embodiments, the cross section of the first cover plate, the first lateral plate and the second lateral plate together is H-shaped, and the cross section of the second cover plate, the first lateral plate and the second lateral plate together is H-shaped.

For example, in some embodiments, the first end head, the first cover plate, the first lateral plate and the second lateral plate are integrally formed.

For example, in some embodiments, the first end head, the first cover plate, the first lateral plate and the second lateral plate are formed by pressure molding.

For example, in some embodiments, the second cover plate is, via either side thereof, connected to the first lateral plate and the second lateral plate respectively over the entire length in the first direction by friction stir welding.

For example, in some embodiments, the first cover plate is, via either side thereof, connected to the first lateral plate and the second lateral plate respectively over the entire length in the first direction by friction stir welding.

For example, in some embodiments, the first cover includes a first sub cover plate and a second sub cover plate, while the first end head includes a first sub end head integrally formed with the first sub cover plate and a second sub end integrally formed with the second sub cover plate, the first sub cover plate and the second sub cover plate being connecting with the first sub end head and the second sub end head respectively by friction stir welding over the entire length in the first direction. And the second cover plate includes a third sub cover plate and a fourth sub cover plate, while the second end head includes a third sub end head integrally formed with the third sub cover plate and a fourth sub end head integrally formed with the fourth sub cover plate—the third sub cover plate and the fourth sub cover plate being connected with the third sub end head and the fourth sub end head respectively by friction stir welding over the entire length in the first direction.

Another aspect of the present disclosure relates to a bus duct including the aforementioned bus duct shell.

BRIEF DESCRIPTION OF THE DRAWINGS

In order to more clearly describe the technical solutions of the embodiments of the present disclosure, the drawings that need to be used in the embodiments will be briefly introduced in the following. It should be understood that the following drawings only show certain embodiments of the present disclosure, and therefore it should be regarded as a limitation of the scope of the present application. For those of ordinary skill in the art, other related drawings can be obtained based on these drawings without creative work. In the drawings:

FIGS. 8A-8B are schematic views of the manufacturing process of the first end head, the first cover plate, the first lateral plate and the second lateral plate of the bus duct shell according to yet another embodiment of the present disclosure;

FIGS. 9A-9B are schematic views of the manufacturing process of the second end head and the second cover plate of the bus duct shell according to yet another embodiment of the present disclosure;

DETAILED DESCRIPTION OF EMBODIMENTS

Figure 1:
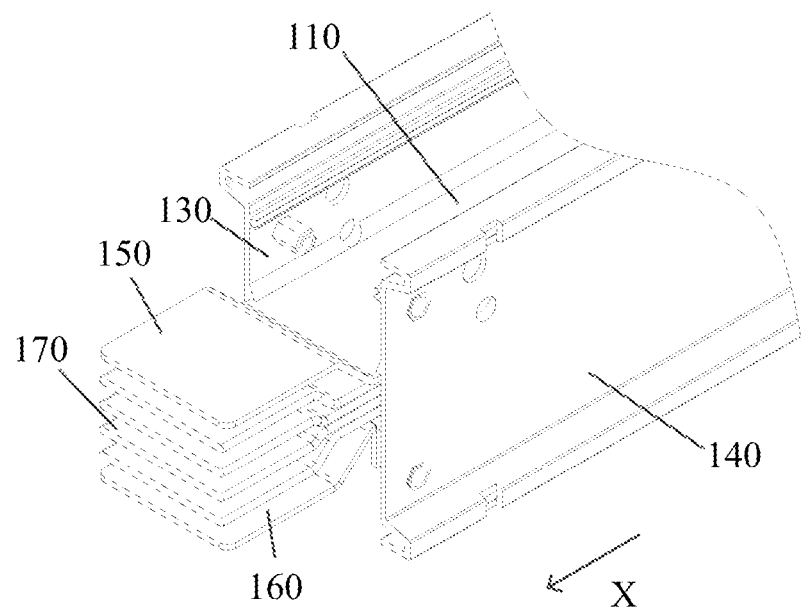
FIG. 1 is a perspective view of a portion of a bus duct including a bus duct shell according to an embodiment of the present disclosure.

In order to make the objectives, technical solutions, and advantages of the embodiments of the present disclosure clearer, the technical solutions of the embodiments of the present disclosure will be described clearly and completely in conjunction with the accompanying drawings. Obviously, the described embodiments are part of the embodiments of the present disclosure, rather than all of the embodiments. Based on the described embodiments of the present disclosure, all other embodiments obtained by those of ordinary skill in the art without creative labor are within the protection scope of the present disclosure.

Hereinafter, a bus duct shell according to an embodiment of the present disclosure will be described in detail with reference to the accompanying drawings. In order to make the objectives, technical solutions, and advantages of the embodiments of the present disclosure clearer, the technical solutions in the embodiments of the present disclosure will be described clearly and completely in conjunction with the accompanying drawings in the embodiments of the present disclosure. Obviously, the described embodiments are part of the embodiments of the present disclosure, rather than all of the embodiments.

Therefore, the following detailed description of the embodiments of the present disclosure provided in conjunction with the accompanying drawings is not intended to limit the protection scope of the present disclosure, but merely represents selected embodiments of the present disclosure. Based on the embodiments in the present disclosure, all other embodiments obtained by those of ordinary skill in the art without creative work shall fall within the protection scope of the present disclosure.

In the description of the present disclosure, it should be understood that the directions or positional relationships indicated by the terms "upper", "lower", "left", "right", "inner", "outer", etc. are based on those shown in the drawings or those usually placed when the disclosed product is used, or those commonly understood by those skilled in the art, and they are only used for the convenience of describing the present disclosure and for simplifying the description, rather than for indicating or implying that a device or a element must have a specific orientation, be conFig.d and operated in a specific orientation, and therefore they should not be understood as a limitation of the present disclosure.

Figure 10A:
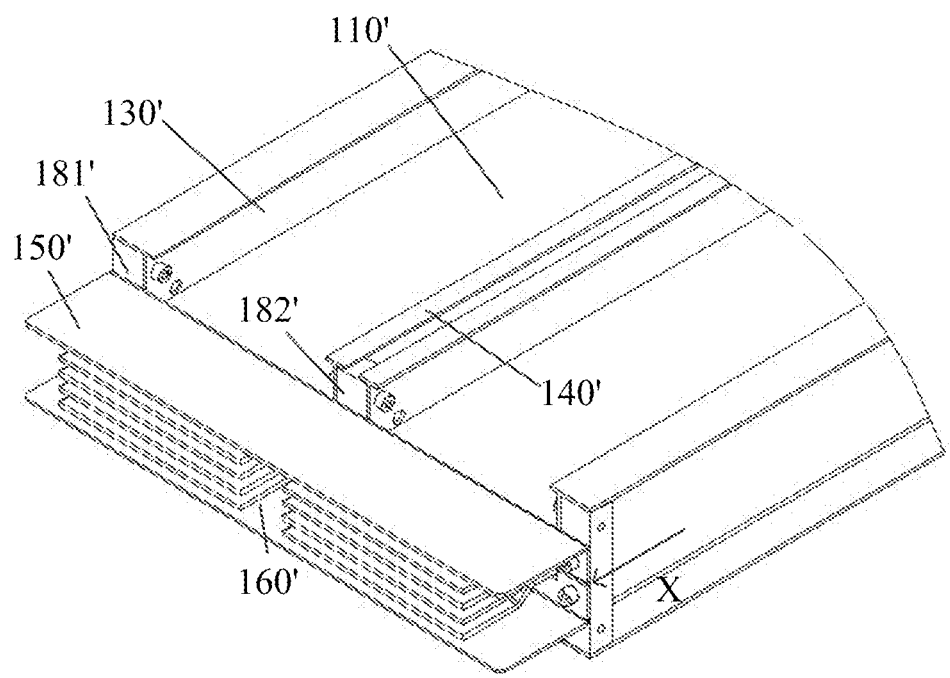
FIGS. 10A-10B show a bus duct including a bus duct shell according to the prior art.
Figure 10B:
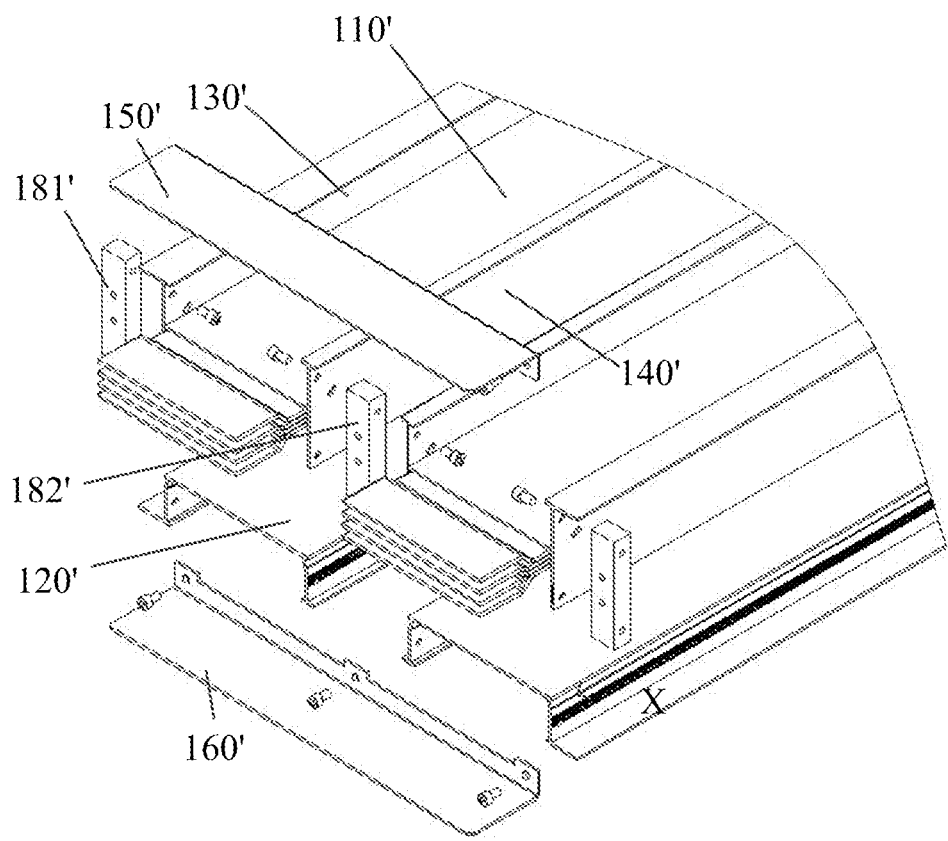

FIGS. 10A and 10B are a bus duct including a bus duct shell according to the prior art, which includes a first cover plate 110', a second cover plate 120', a first lateral plate 130', a second lateral plate 140', a first end head 150' and a second end head 160', wherein the first cover plate 110', the second cover plate 120', the first lateral plate 130', and the second lateral plate 140' define a cavity for accommodating a bus bar. A first aluminum block 181' and a second aluminum block 182' are respectively fixed to the first lateral plate 130' and the second lateral plate 140', a first end head 150' that is L-shaped and a second end 160' that is L-shaped are fixed to the upper and lower sides of the first aluminum block 181' and the second aluminum block 182' by screws, so that the first end head 150' and the second end head 160' are supported by the first aluminum block 181' and the second aluminum block 182' and respectively comes into contact with the first cover plate 110' and the second cover plate 120'. Since the first end head 150' and the second end head 160' are in virtual connection with the first cover plate 110' and the second cover plate 120' respectively via screws, the first aluminum block 181' and the second aluminum block 182', the grounding capacity of the bus duct shell drops sharply at respective connection of the first end head 150' and the second end head 160'.

In addition, in general, the first cover plate 110', the first lateral plate 130' and the second lateral plate 140' are integrally formed by extrusion molding. However, for high-current bus bars, the width of the first cover plate 110' of the bus duct shell is relatively large and cannot be manufactured by extrusion molding. Therefore, as shown in FIGS. 10A and 10B, two bus ducts are jointed side by side, and then connected by the second aluminum block 182', the first end head 150', and a second end head 160' that are common to the two bus ducts. Therefore, installation is inconvenient.

In addition, the rigidity and waterproof performance of the bus duct shell need to be improved. Therefore, there are many problems in the bus duct shell in the prior art that need to be solved.

The bus duct shell according to the present disclosure overcomes at least one of the above-mentioned problems. The following describes three embodiments according to the present disclosure to explain the bus duct shell according to the present disclosure. In the present disclosure, a first embodiment shown in FIGS. 1-5C includes a first end head, a first cover plate, a first lateral plate and a second lateral plate that are integrally formed, and a second end head and a second cover plate that are integrally formed; the second embodiment shown in FIGS. 6-7 includes a first lateral plate, a second lateral plate which are separated components, and a first end head and a first cover plate which are integrally formed and a second end head and a second cover plate which are integrally formed, and may be more suitable for high-current busbars; and a third embodiment shown in FIGS. 8A-9B, which is composed of a four-piece structure, may also be more suitable for high-current busbars.

Figure 2:
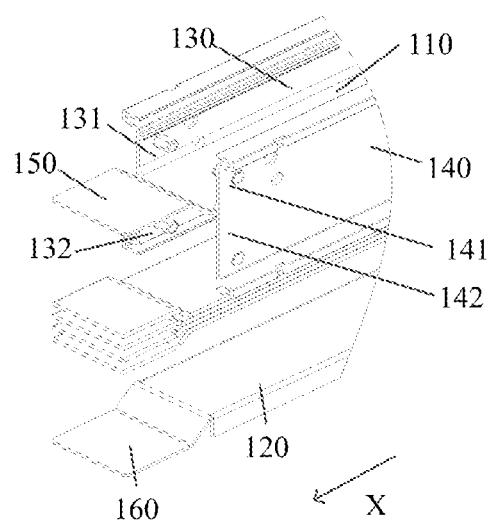
FIG. 2 is an exploded perspective view of the bus duct shown in FIG. 1.

FIG. 1 is a perspective view of a portion of a bus duct including a bus duct shell 1 according to an embodiment of the present disclosure. FIG. 2 is an exploded perspective view of the bus duct shown in FIG. 1. The bus duct shell 1 includes a first cover plate 110, a second cover plate 120 opposite to the first cover plate 110, a first lateral plate 130, a second lateral plate 140 opposite to the first lateral plate 130, a first end head 150 and second end head 160. The first cover plate 110, the second cover plate 120, the first lateral plate 130 and the second lateral plate 140 extend in a first direction X and define a cavity. A plurality of bus bars 170 are accommodated in the cavity and extend in the first direction X therein. In the illustrated embodiment, the number of bus bars 170 is 4, but it is not limited thereto. The cross section of the first cover plate 110, the first lateral plate 130, and the second lateral plate 140 together is H-shaped, and the cross section of the second cover plate 120, the first lateral plate 130 and the second lateral plate 140 together is H-shaped. That is, the first lateral plate 130 has a first protrusion 131 extending beyond an outer surface of the first cover 110 and a second protrusion 132 extending beyond an outer surface of the second cover 120, and the second lateral plate 140 has a third protrusion 141 extending beyond an outer surface of the first cover plate 110 and a fourth protrusion 142 extending beyond an outer surface of the second cover plate 120.

The first end head 150 is integrally formed with the first cover plate 110 and extends from an end of the first cover plate 110 beyond the first lateral plate 130 and the second lateral plate 140, and the second end head 160 is integrally formed with the second cover plate 120 and extends from an end of the second cover plate 120 beyond the first lateral plate 130 and the second lateral plate 140. The ends of the bus bar 170 extend beyond the first lateral plate 130 and the second lateral plate 140 and are located between the first end head 150 and the second end head 160. The first end head 150 includes a first bending portion 151 bent in a direction away from the cavity and a first extension 152 extending in the first direction X. The second end 160 includes a second bending portion 161 bent in a direction away from the cavity and a second extension 162 extending in the first direction X. From top to bottom, the first end head 150, the ends of the plurality of bus bars 170, and the second end head 160 are arranged at intervals, so that the two bus ducts are connected via a connector through the ends of the respective bus bars 170, the first end head 150, the second end head 160 thereof.

The first end head 150, the second end head 160, the first cover plate 110, the second cover plate 120, the first lateral plate 130 and the second lateral plate 140 are all made of metal materials, preferably aluminum or aluminum alloy.

Figure 3:
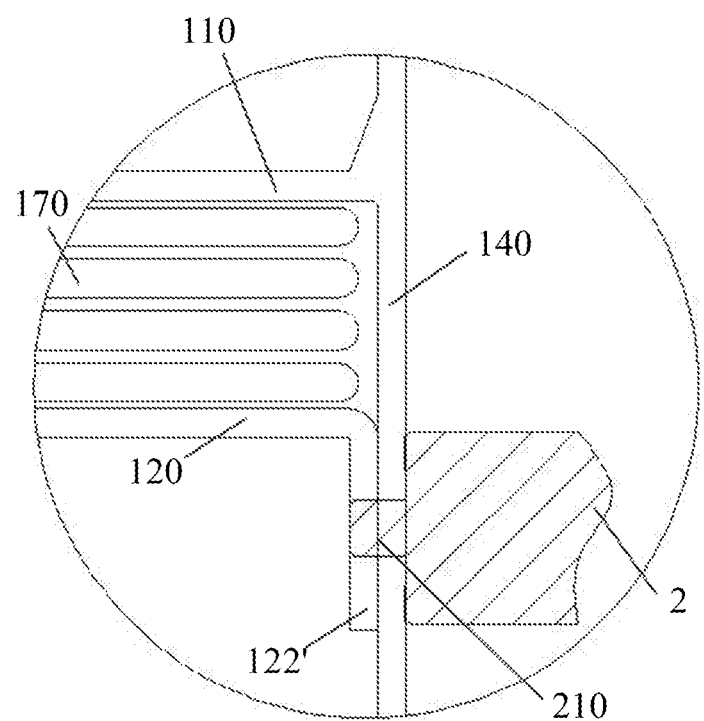
FIG. 3 is a schematic view of the process of friction stir welding the second cover plate to the second lateral plate.

As shown in FIGS. 1-3, in this embodiment, the first end head 150, the first cover plate 110, the first lateral plate 130 and the second lateral plate 140 are integrally formed. Two sides of the second cover plate 120 are respectively welded to the first lateral plate 130 and the second lateral plate 140 by friction stir welding over the entire length in the first direction X. FIG. 3 is a schematic diagram of the process of lapping assembly by friction stir welding. In the welding process of the friction stir welding, the stirring head 210 of the stirring finger stick 2 is inserted into the lapping zone between the second cover plate 120 and the first lateral plate 130 or the second lateral plate 140.

Figures 4A, 4B, 4C:
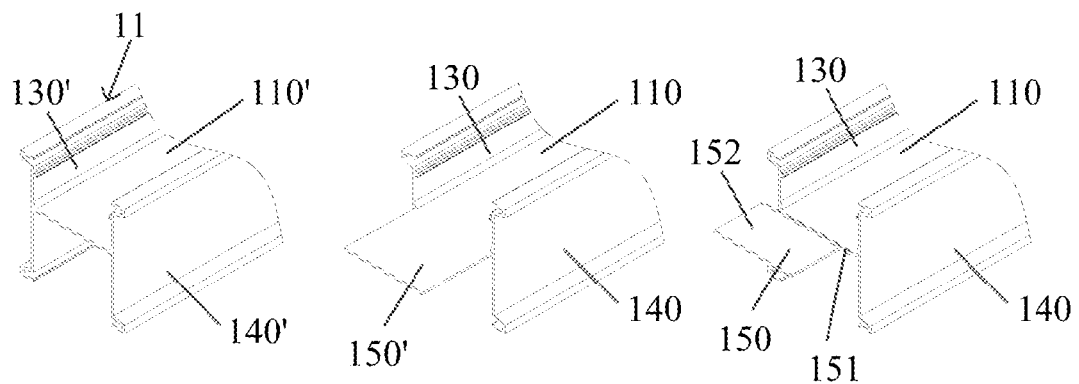
FIGS. 4A-4C is a schematic perspective view of the manufacturing process of the first end head, the first cover plate, the first lateral plate and the second lateral plate of the bus duct shown in FIG. 1.

FIGS. 4A-4C show the manufacturing process of the first end head 150, the first cover plate 110, the first lateral plate 130 and the second lateral plate 140 integrally formed according to this embodiment of the present disclosure. As shown in FIG. 4A, a first molded part 11, with a substantially H-shaped cross section, including a first horizontal plate 110' and two lateral plates 130', 140' is formed from a first blank by a pressure molding process such as extrusion molding and stamping molding. The first blank may be a block blank. By the expression substantially H-shaped', it means that modification of a local part of the H shape is not excluded. The first horizontal plate 110' and the two lateral plates 130', 140' extend in the first direction X. As shown in FIG. 4B, a segment of each the two lateral plates 130', 140' at a respective end thereof is removed along the first direction X by sawing, milling or other means to form the first lateral plate 130, the second lateral plate 140, the first cover plate 110 and a first preformed end head 150'. As shown in FIG. 4C, the first preformed end head 150' is bent to offset a certain distance from the first cover plate 110 in a vertical direction perpendicular to the first direction X, so as to form a first end head 150 that includes a first bending portion 151 bent in a vertical direction perpendicular to the first direction X and a first extension 152 extending in the first direction X.

Figures 5A, 5B, 5C:
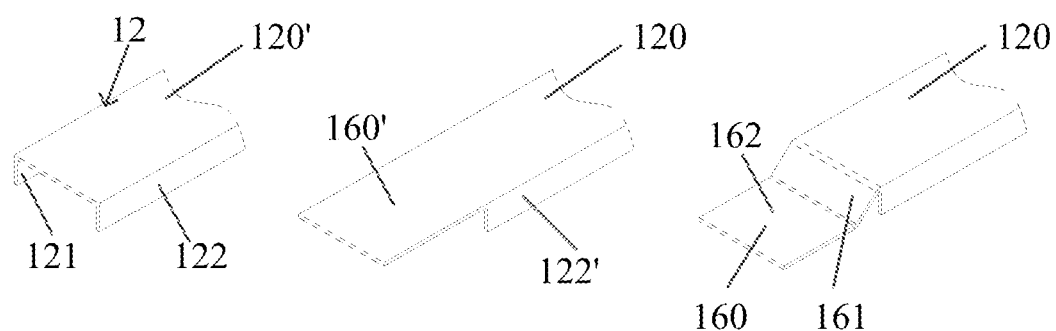
FIGS. 5A-5C is a schematic perspective view of the manufacturing process of the second end head and the second cover plate of the bus duct shown in FIG. 1.

FIGS. 5A-5C show the manufacturing process of the second end head 160 and the second cover plate 120 that are integrally formed according to this embodiment of the present disclosure. As shown in FIG. 5A, a second molded part 12, with a U-shaped cross section, including a second horizontal plate 120' and two lateral protrusions 121, 122 is formed from a blank by extrusion molding, bending molding, stamping molding, etc. The horizontal plate and the two lateral protrusions 121 and 122 extend in the first direction X. As shown in FIG. 5B, a segment of each of the two lateral protrusions 121, 122 at a respective end thereof is removed along the first direction X by sawing or other means to form the second cover plate 120, a first lateral welding protrusion (not shown), a second lateral welding protrusion 122' and a second preformed end head 160'. As shown in FIG. 5C, the second preformed end head 160' is bent to offset a certain distance from the second cover plate 120 in a vertical direction perpendicular to the first direction X, so as to form a second end head 160 that includes a second bending portion 161 bent in a vertical direction perpendicular to the first direction X and a second extension 162 extending in the first direction X.

Then, referring to FIG. 3 again, the first lateral welding protrusion and the second lateral welding protrusion 122' are respectively welded to the first lateral plate 130 and the second lateral plate 140 integrally formed with the first cover plate 110.

However, the manufacturing process of the first end head 150, the first cover plate 110, the first lateral plate 130 and the second lateral plate 140 that are integrally formed, the manufacturing process of the second end head 160 and the second cover plate 120 that are integrally formed, and the process of welding the two together is not limited to this, and the above manufacturing processes can be modified according to needs, for example, according to different variants of the bus duct shell 1, as well as to processing technology, cost and other requirements.

Figure 6:
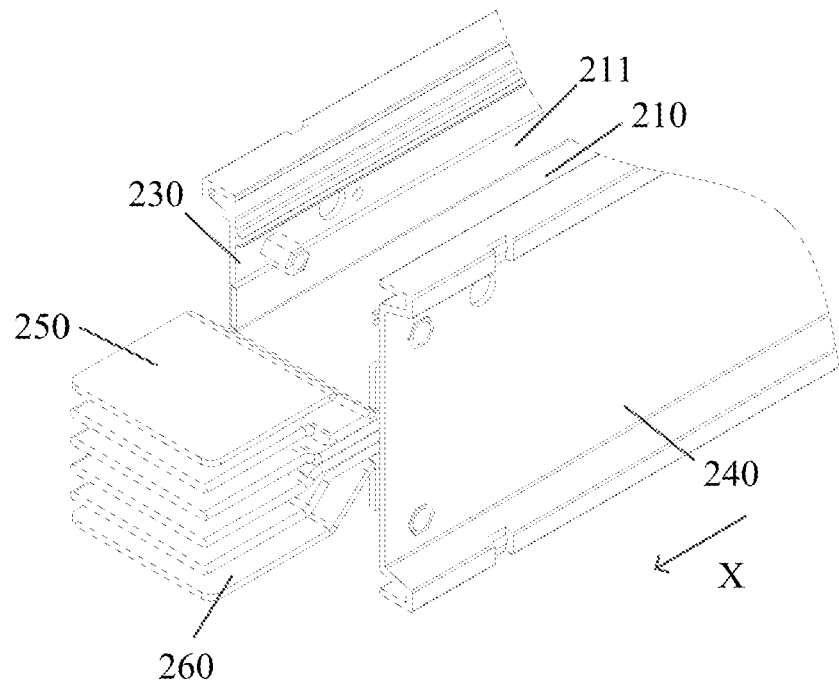
FIG. 6 is a perspective view of a portion of a bus duct including a bus duct shell according to another embodiment of the present disclosure.
Figure 7:
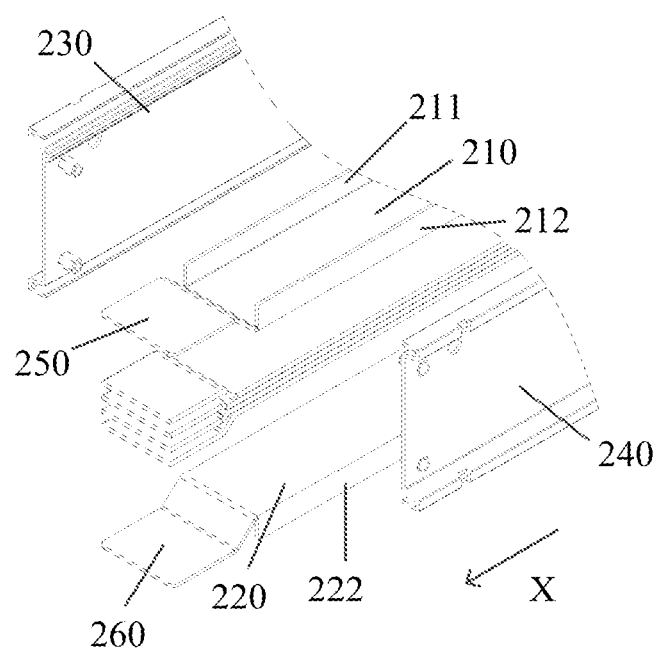
FIG. 7 is an exploded perspective view of the bus duct shown in FIG. 6.

FIG. 6 is a portion of a bus duct including a bus duct shell 2 according to another embodiment of the present disclosure. FIG. 7 is an exploded perspective view of the bus duct shown in FIG. 6. For ease of description, the description of parts of the bus duct shell in this embodiment that is the same as the embodiment shown in FIGS. 1-2 or can be easily understood from the latter will be partially omitted.

As shown in FIGS. 6-7, the bus duct shell 2 includes a first cover plate 210, a second cover plate 220, a first lateral plate 230, a second lateral plate 240, a first end head 250, and a second end head 260. The first cover plate 210 and the first end head 250 are integrally formed, and the second cover plate 220 and the second end head 260 are integrally formed. The difference from the bus duct shell 1 shown in FIGS. 1-2 is in that the first cover plate 210, the first lateral plate 230 and the second lateral plate 240 are not integrally formed. The first cover plate 210 includes a third lateral welding protrusion 211 and a fourth lateral welding protrusion 212 extending in the first direction X at either side thereof. The first cover plate 210 is welded to the first lateral plate 230 and the second lateral plate 240 by welding the lateral welding protrusions 211, 212 on both sides thereof to the first lateral plate 230 and the second lateral plate 240. Preferably, the first cover plate 210 is welded to the first lateral plate 230 and the second lateral plate 240 by friction stir welding. The second cover 220 includes a first lateral welding protrusion (not shown) and a second lateral welding protrusion 222 extending in the first direction X at either side thereof. The second cover plate 220 is welded to the first lateral plate 230 and the second lateral plate 240 by welding the lateral welding protrusions on both sides thereof respectively to the first lateral plate 230 and the second lateral plate 240. Preferably, the second cover plate 220 is welded to the first lateral plate 230 and the second lateral plate 240 by friction stir welding. The first cover plate 210, the second cover plate 220, the first lateral plate 230, and the second lateral plate 240 can be formed from plates or profiles by pressure molding, such as bending (especially suitable for plates), extrusion molding (especially for suitable profiles), and stamping molding.

Similar to that described with reference to FIGS. 5A-5C, the manufacturing method of the first cover plate 210 and the first end head 250 that are integrally formed is to form a molded part by stamping molding, and a segment of each of two lateral protrusions at a respective end thereof is removed along the first direction X to form the first cover plate 210, the third lateral welding protrusion 211, the fourth lateral welding protrusion 212 and a preformed end head, and then the preformed end head is bent to offset a certain distance from the first cover plate 210 in a vertical direction perpendicular to the first direction X to form the first end head 250. For example, when the width of the bus duct shell in the transverse direction perpendicular to the first direction X and the vertical direction is relatively large, it may be difficult to form the first molded part from the blank by means of extrusion molding or the like. Therefore, the bus duct shell can be designed as shown in FIGS. 6 and 7.

FIGS. 8A-8B are schematic diagrams of the manufacturing process of the first cover plate, the first lateral plate and the second lateral plate of the bus duct shell 3 according to yet another embodiment of the present disclosure. FIGS. 9A-9B are schematic diagrams of the manufacturing process of the second end head and the second cover plate of the bus duct shell according to this embodiment. The bus duct shell according to this embodiment includes a first cover plate, a second cover plate, a first lateral plate, a second lateral plate, a first end head and a second end head.

For example, when the width of the bus duct shell in the transverse direction perpendicular to the first direction X and the vertical direction is relatively large, the bus duct shell can be designed as a four-piece structure. The first cover plate includes a first sub cover plate and a second sub cover plate, the second cover plate includes a third sub cover plate and a fourth sub cover plate, the first end head includes a first sub end head and a second sub end head, and the second end head includes a third sub end head and a fourth sub end head. A first piece of the four-piece structure includes the first lateral plate, the first sub cover plate and the first sub end head that are integrally formed, and a second piece of a four-piece structure includes the second lateral plate, the second sub cover plate and the second sub end head that are integrally formed, a third piece of the four-piece structure includes the third sub cover plate and the third sub end head that are integrally formed, and a fourth piece of the four-piece structure includes the fourth sub cover plate and the fourth sub end head that are integrally formed.

A first pre-formed piece, a second pre-formed piece, a third pre-formed piece, and a fourth pre-formed piece can be manufactured by pressure molding methods such as extrusion molding and stamping molding. The first pre-formed piece includes a lateral plate 330 and a first sub horizontal plate 311 that are integrally formed and perpendicular to each other, the second pre-formed piece includes a lateral plate 340 and a second sub horizontal plate 312 that are integrally formed and perpendicular to each other, the third pre-formed piece includes a third sub horizontal plate 321, and the fourth pre-formed piece includes a fourth sub horizontal plate 322. Then, as shown in FIG. 8A, the first sub horizontal plate 311 and the second sub horizontal plate 312 are connected together by friction stir welding over their entire extension length, and as shown in FIG. 9A, the third sub horizontal plate 321 and the fourth sub horizontal plate 322 are connected together by friction stir welding over their entire extension length, wherein the stirring head of the finger stick of friction stir welding is inserted into the seams used for welding. Thus, the first pre-formed piece and the second pre-formed piece are welded together, and the third pre-formed piece and the fourth pre-formed piece are welded together.

In this way, as shown in FIG. 8B, the first preformed sheet and the second preformed sheet constitute a molded part similar to the first molded part 11 of FIG. 4A, and then, as shown in FIGS. 4A-4C and with reference to FIGS. 4A-4C In the described steps, the molded part is processed into an integrally formed first lateral plate, a second lateral plate, a first cover plate and a first end. In addition, as shown in FIG. 9B, the third preformed sheet and the fourth preformed sheet constitute a molded part similar to the second molded part 12 of FIG. 5A, and then, as shown in FIG. 5A-5C and with reference to FIGS. 5A-5C In the described steps, the molded part is processed into an integrally formed second cover plate and a second end.

Different from traditional MIG (metal insert-gas welding) welding, friction stir welding uses a stirring head of a finger stick in a special hard material and the stirring head is inserted into the seam to be welded while rotating, causing it to deform plastically to realize material connection. The temperature generated during the process is much lower than the heat-resistant grade of the insulating material, so the insulating material at the bus duct will not be damaged.

In the above embodiment, the first end head and the first cover plate are integrally formed, and the second end head and the second cover plate are integrally formed. Compared with the case where the first end head and the first cover plate or the second end head and the second cover plate are connected together by fasteners such as bolts or rivets, this ensures that the grounding capacity is uniform over the entire length of the bus duct, providing improved short-circuit capability to ground.

For example, as shown in FIGS. 10A and 10B, an ordinary bus duct includes an independent ground wire for short-circuiting to ground. The independent ground wire can be arranged in the cavity of the bus duct shell parallel to the bus bar. If the independent ground wire is removed, the current will concentrated at the bolt connection between the first end head and the first cover plate or the bolt connection between the second end plate and the second cover plate, since the first end head and the second end head comes into contact with the first cover plate and the second cover plate respectively only by bolts on both sides. The current at the bolt connections increases significantly, the temperature rises sharply, and finally melting occurs. However, in some embodiments according to the disclosure, the independent ground wire in the bus duct can be removed, the current will not be concentrate at a specific part, and grounding protection can be realized through the short-circuit capability to ground of the bus duct shell only.

In addition, the bus duct shell according to the above-mentioned embodiment has good rigidity and waterproof performance.

The scope of the present disclosure is not limited by the above described embodiments, but by the appended claims and their equivalents.

What is claimed is:
1. A bus duct shell, including:
a first lateral plate;
a second lateral plate opposite to the first lateral plate;
a first cover plate;
a second cover plate opposite to the first cover plate;

a first end head integrally formed with the first cover plate and extending from the end of the first cover plate beyond the first lateral plate and the second lateral plate; and a second end head integrally formed with the second cover plate and extending from the end of the second cover plate beyond the first lateral plate and the second lateral plate;

wherein the first lateral plate, the second lateral plate, the first cover plate, and the second cover plate extend in a first direction, and define a cavity extending in the first direction for receiving a bus bar, the first cover plate includes a first sub cover plate and a second sub cover plate, and the first end head includes a first sub end head integrally formed with the first sub cover plate and a second sub end head integrally formed with the second sub cover plate, the first sub cover plate and the second sub cover plate and the first sub end head and the second sub end head being respectively connected together by friction stir welding over the entire length in the first direction, and the second cover includes a third sub cover plate and a fourth sub cover plate, and the second end head includes a third sub end head integrally formed with the third sub cover plate and a fourth sub end head integrally formed with the fourth sub cover plate, the third sub cover plate and the fourth sub cover plate and the third sub end head and the fourth sub end head being respectively connected together by friction stir welding over the entire length in the first direction.

2. The bus duct shell according to claim 1, wherein an end of the bus bar is located between the first end head and the second end head.

3. The bus duct shell according to claim 2, wherein the first end head is offset relative to the first cover plate in a direction away from the cavity to include a first bending portion that is bent in a direction away from the cavity and a first extension that extends in the first direction, and the second end head is offset relative to the second cover plate in a direction away from the cavity to include a second bending portion bending in a direction away from the cavity and a second extension extending in the first direction.

4. The bus duct shell according to claim 1, wherein the cross section of the first cover plate, the first lateral plate and the second lateral plate together is H-shaped, and the cross section of the second cover plate, the first lateral plate and the second lateral plate together is H-shaped.

5. The bus duct shell according to claim 1, wherein the first end head, the first cover plate, the first lateral plate and the second lateral plate are integrally formed.

6. The bus duct shell according to claim 5, wherein the first end head, the first cover plate, the first lateral plate and the second lateral plate are formed by pressure molding.

7. The bus duct shell according to claim 1, wherein the second cover plate is, via either side thereof, connected to the first lateral plate and the second lateral plate respectively over the entire length in the first direction by friction stir welding.

8. The bus duct shell according to claim 7, wherein the first cover plate is, via either side thereof, connected to the first lateral plate and the second lateral plate respectively over the entire lengths in the first direction by friction stir welding.

9. A bus duct, comprising a bus duct shell, wherein the bus duct shell includes:

a first lateral plate;

a second lateral plate opposite to the first lateral plate;

a first cover plate;

a second cover plate opposite to the first cover plate;

a first end head integrally formed with the first cover plate and extending from the end of the first cover plate beyond the first lateral plate and the second lateral plate; and a second end head integrally formed with the second cover plate and extending from the end of the second cover plate beyond the first lateral plate and the second lateral plate;

wherein the first lateral plate, the second lateral plate, the first cover plate, and the second cover plate extend in a first direction, and define a cavity extending in the first direction for receiving a bus bar, the first cover plate includes a first sub cover plate and a second sub cover plate, and the first end head includes a first sub end head integrally formed with the first sub cover plate and a second sub end head integrally formed with the second sub cover plate, the first sub cover plate and the second sub cover plate and the first sub end head and the second sub end head being respectively connected together by friction stir welding over the entire length in the first direction, and the second cover includes a third sub cover plate and a fourth sub cover plate, and the second end head includes a third sub end head integrally formed with the third sub cover plate and a fourth sub end head integrally formed with the fourth sub cover plate, the third sub cover plate and the fourth sub cover plate and the third sub end head and the fourth sub end head being respectively connected together by friction stir welding over the entire length in the first direction.

10. The bus duct according to claim 9, wherein an end of the bus bar is located between the first end head and the second end head.

11. The bus duct according to claim 10, wherein the first end head is offset relative to the first cover plate in a direction away from the cavity to include a first bending portion that is bent in a direction away from the cavity and a first extension that extends in the first direction, and the second end head is offset relative to the second cover plate in a direction away from the cavity to include a second bending portion bending in a direction awy from the cavity and a second extension extending in the first direction.

12. The bus duct according to claim 9, wherein the cross section of the first cover plate, the first lateral plate and the second lateral plate together is H-shaped, and the cross section of the second cover plate, the first lateral plate and the second lateral plate together is H-shaped.

13. The bus duct according to claim 9, wherein the first end head, the first cover plate, the first lateral plate and the second lateral plate are integrally formed.

14. The bus duct according to claim 13, wherein the first end head, the first cover plate, the first lateral plate and the second lateral plate are formed by pressure molding.

15. The bus duct according to claim 9, wherein the second cover plate is, via either side thereof, connected to the first lateral plate and the second lateral plate respectively over the entire length in the first direction by friction stir welding.

16. The bus duct according to claim 15, wherein the first cover plate is, via either side thereof, connected to the first lateral plate and the second lateral plate respectively over the entire lengths in the first direction by friction stir welding.

* * * * *